S. B. HOWES.
FISHING-SEINES.
No. 194,434. Patented Aug. 21, 1877.
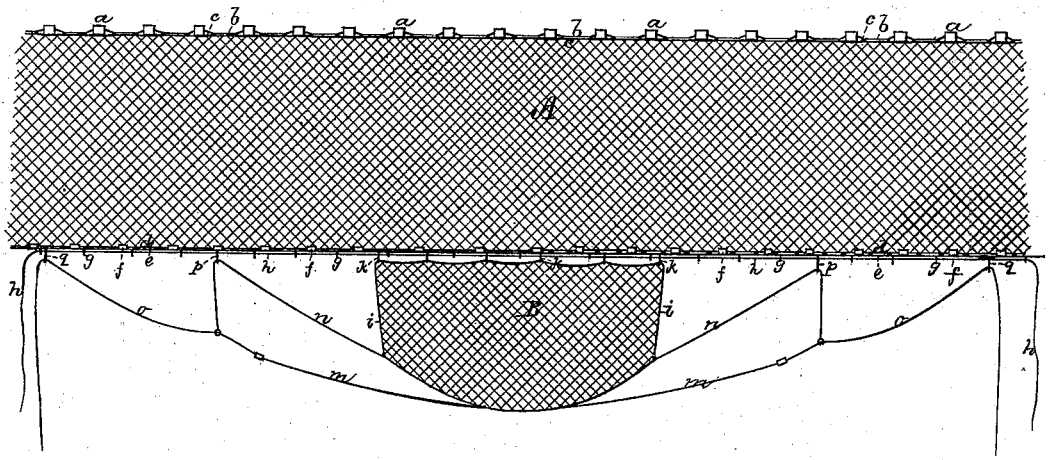
Witnesses.
Inventor
Sears. B. Howes.
by his attorney
R. H. Eddy.

UNITED STATES PATENT OFFICE.

SEARS B. HOWES, OF WEST DENNIS, MASSACHUSETTS.

IMPROVEMENT IN FISHING-SEINES.

Specification forming part of Letters Patent No. 194,434, dated August 21, 1877; application filed February 20, 1877.

*To all whom it may concern:*

Be it known that I, SEARS B. HOWES, of West Dennis, in the county of Barnstable, of the State of Massachusetts, have invented a new and useful Improvement in Fishing-Seines; and do hereby declare the same to be described in the following specification, and represented in the accompanying drawing, which is a top view of a seine with my improvement.

The seine A is a long rectangular netting, provided with corks or floats $a\ a\ a$, held by ropes $b\ c$, fixed to the upper edge of the netting. At its lower edge such netting is provided with ropes $d\ e$ fastened to it, and serving to support a series of leads or sinkers, $f$, and a series of eyes, $g$. A pursing line or rope, $h$, extends as usual through the several eyes $g$.

There is combined with the body A a bottom net, B, formed as shown. The edge rope $i$ of the net is furnished at its front with a series of eyes, $k$, to receive the seine pursing-line $h$, which goes through these eyes and the next adjacent eyes of the seine alternately. The rope or line $h$ thus not only serves to connect the bottom net with the seine, but answers to partially purse the bottom net.

Furthermore, there is attached to the rear part of the bottom net sundry drag ropes or lines for extending the bottom net or drawing it out horizontally, or thereabout, laterally and backward. These lines (shown at $m\ n\ m\ n$) are branch lines from two single lines $o\ o$. Each outer branch line $n$ passes through an eye, $p$, fixed to the lower edge of the seine. Each line $o$ also goes through an eye, $q$, fixed to the lower edge or part of the seine.

By means of the lines $o\ m\ n$ the bottom net may be drawn or dragged back from the front of the seine, in order to prevent an entrapped shoal of fish from escaping underneath such front. The drag-lines also aid in pursing the bottom net.

From the above it will be seen that the bottom net is not triangular in form, and in one and the same piece with the seine, but is in a separate piece, and is held to the seine by the pursing-line of the latter. Also, that it has drag-lines that are independent of or not attached to the main pursing-line of the seine, such drag-lines being rove or run through eyes fixed to the seine.

I do not claim a seine having a triangular bottoming provided with branch lines leading from two pursing-lines to the sides of said bottoming, all being as shown in the United States Patent No. 120,974. I dispense with such branch lines and use a separate bottom net, and employ the pursing-line of the seine to connect the separate bottom net to the seine and to purse it in part, as well as to purse the seine. I also combine with the seine and the bottom net a set of drag-lines, by which I am enabled to draw backward the rear part of the bottom net without pulling on the pursing-line of the seine. Thus by means of such drag-lines I can accomplish the drawing back of the bottom net without at the same time pursing it or the seine—a result which cannot be accomplished by lines serving merely to purse the seine and the bottoming. Therefore,

I claim as my invention—

1. The bottom net B, separable from the seine A, and connected thereto by the pursing-line $h$ of the latter, extended through loops or eyes $k$ affixed to the front edge of the bottom net, all as set forth.

2. The combination of the seine A, and its pursing-line $h$, with the bottom net B, and with the series of back and lateral drag-lines $m\ n\ o\ m\ n\ o$ applied to the said bottom net and seine, and arranged therewith substantially in the manner as shown and described.

SEARS B. HOWES.

Witnesses:
R. H. EDDY,
J. R. SNOW.